June 1, 1954     W. H. BUSCHMAN     2,679,688
KITCHEN IMPLEMENT
Filed June 27, 1950
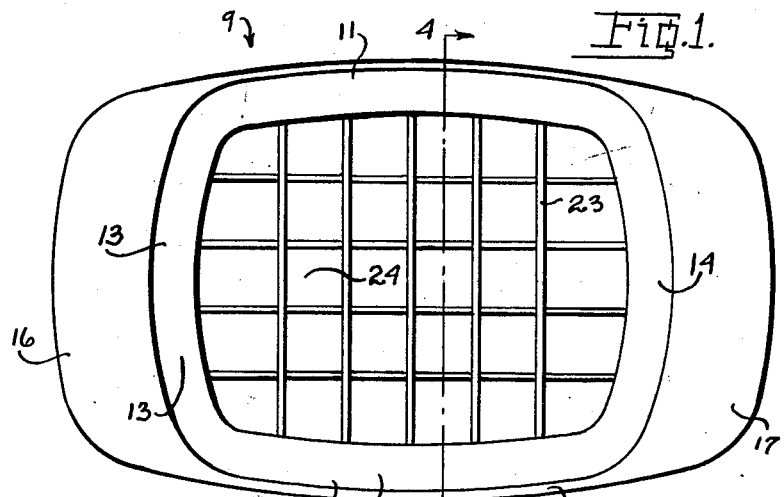
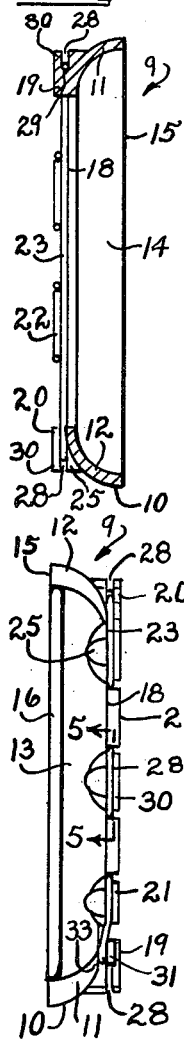
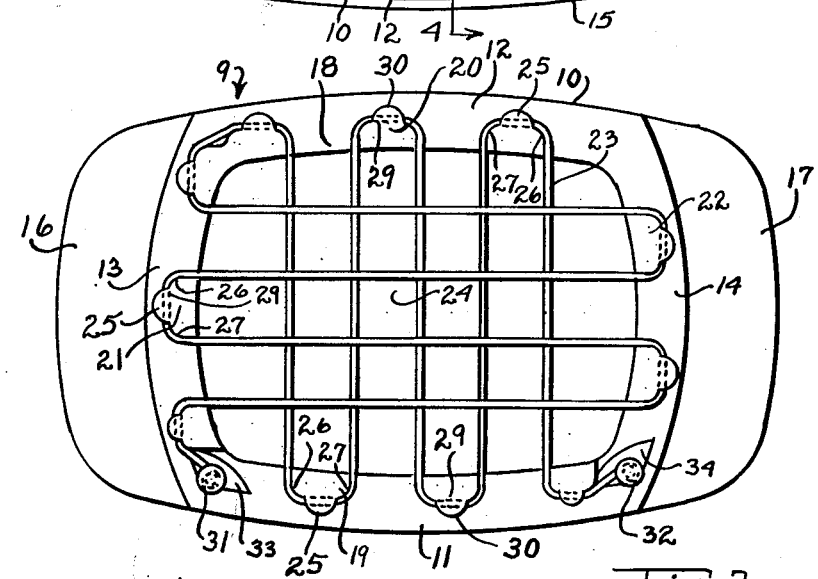
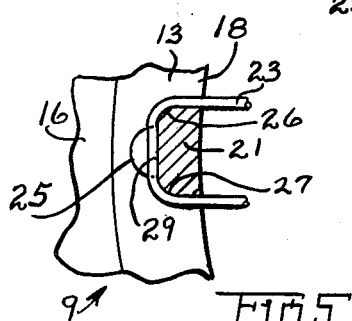
INVENTOR.
WILLARD H. BUSCHMAN
BY
Joseph A. Rane
Attorney Patented June 1, 1954

2,679,688

UNITED STATES PATENT OFFICE 2,679,688

KITCHEN IMPLEMENT

Willard H. Buschman, Cincinnati, Ohio, assignor to R. A. Frederick Company, Inc., Cincinnati, Ohio, a corporation of Ohio Application June 27, 1950, Serial No. 170,661

2 Claims. (Cl. 30—117)

This invention relates to improvements in a kitchen implement and particularly to a cutting device for cutting potatoes into lengths which are subsequently cooked to make what is popularly known as "French fried" potatoes.

Broadly, devices for this purpose are known but several defects are apparent in prior structures which may be considered as problems to be overcome that apparently have been beyond the scope of the skilled mechanic. One such problem is the mounting of the cutter wire on the cutter frame in such a way that it will withstand the necessary pressure of cutting through a raw potato without breaking after a limited number of uses. A further problem is in producing the kitchen implement so that it can be economically produced to be attractive in price to the housewife.

By the present invention each of the foregoing problems have been solved, and it is therefore the principal object of the present invention to provide a so called "French fry cutter" wherein the cutting wire is so mounted as to have a long life under normal usable conditions.

Another object of this invention is the provision of a French fry cutter in which the cutting wire is mounted on the cutting frame without resort to sharp bends or corners wherefore when subjected to cutting strain the cutting wire will not snap or fracture as occurs frequently with prior structures.

A still further object of this invention is to provide a structure that will accomplish the foregoing objects that is economical to produce requiring a minimum of machining and labor in manufacture and assembly.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a top plan view of the kitchen implement forming the subject of the present invention.

Fig. 2 is a bottom plan view of the implement in Fig. 1.

Fig. 3 is an end elevational view of the implement as seen for example from the left-hand end of Fig. 2.

Fig. 4 is a vertical transverse sectional view through the implement taken on line 4—4 on Fig. 1.

Fig. 5 is a view partly in section and partly in elevation on an enlarged scale and taken on line 5—5 on Fig. 3.

Throughout the several views of the drawings similar reference characters are employed to denote the same or similar parts.

The kitchen implement of the present invention is preferably an aluminum casting 9 and comprises a central portion 10 substantially rectangular in plan view and dish-shaped or bowl-shaped as shown in Fig. 4 and therefore has upwardly arcuately extending side members or walls 11 and 12 and end members or walls 13 and 14. The upper surface of said side and end members or walls form a continuous top surface 15, see particularly Fig. 3, and the casting includes extensions beyond the end members or walls 13 and 14 as handles 16 and 17 which supply means whereby the implement is grasped and handled during use. The said handles 16 and 17 are relatively thin in the nature of fins for thereby providing beneath themselves, and the bottom surface 18 of the frame, finger room.

The improvement of the present invention is in the formation of the means for mounting on the frame central or body portion 10 the cutting wire. Accordingly, depending from the bottom surface 18 of the frame body portion 10 along the side members or walls 11 and 12, respectively, are spaced lugs 19 and 20 said lugs 19 on the side members or wall 11 being staggered with respect to the lugs 20 on the side member or wall 12 as will presently be made clear while along the end members or walls 13 and 14 are, respectively, spaced lugs 21 and 22 with the lugs 21 on the end member or wall 13 staggered with respect to the lugs 22 on the end member or wall 14. It is around these several lugs that the cutting element or wire 23 is arranged to form, in effect, a plurality of cross cutting elements providing between the said cutting elements openings 24 which represent the cross-section of the potato sticks that are formed to be subsequently cooked as French fries.

The lugs 19, 20, 21 and 22 are each substantially identical with one another wherefore it is deemed sufficient if but one of them be described in detail. Accordingly, and with reference to Figs. 2 and 5, the lug 21 is of a dimension, or length, in the direction of extent of the wall carrying it as to correspond to the distance or space between the reaches of the cutting wire 23 and of a dimension, or width, at right-angles to the first dimension sufficient to prevent fracture in the lug regardless of the pressure applied to the cutter wire reaches.

Substantially centrally of the length of the lug there is provided an outwardly projecting reduced protuberance 25. The protuberance 25 is illustrated as substantially semi-circular in plan in Figs. 2 and 5 but it may be any other desirable shape without changing its function. It may be said that each of the lugs 19 to 22, inclusive, is in effect two lugs, the main or body portion thereof and the protuberance 25 which is in effect a supplemental lug.

The corners of the main or body portion of the lug 21 are rounded as at 26 and 27, each to a radius that is less than one-half of the length of the lugs, and with the said rounds, or rounded corners, preferably, extending to the points, respectively, where the sides of the supplemental lug or protuberance 25 outwardly projects from the body of the main lug.

In manufacturing or producing the cutting implement of the present invention the frame is, as above noted, a casting and when formed as a die casting has each of lugs 19 to 22 with its supplementary lug or outwardly projecting protuberance 25 cast solid and upstanding from the bottom 18 of the frame or central portion 10. The lugs 19 to 22, each, project from the frame bottom an amount equal to the thickness of the cutter element or wire 23 plus an amount to provide a lip, as will presently be made clear, under which the cutting wire extends. The implement frame is now subjected to a machining operation, which in effect is substantially a sawing operation, provided by a milling cutter that extends along each side and end of the frame and provides in the supplemental lug or protuberance 25 a slot 28. The slot 28 is formed to a depth to have its bottom 29 substantially tangential to the main lug rounded corners 26 and 27.

In the event the cutting implement is made as a sand casting, instead of a die casting, the slots 28 may be cast into the lugs, and, in this event, the supplemental lugs or outwardly projecting protuberances 25 may be made the full length of the body portion of the lug and the base or bottom 29 of the slot formed to include the rounded corners 26 and 27.

By this construction, therefore, each of the lugs is provided with a slot 28 or each lug is provided with an overhanging lip 30 beneath which the slot 28 extends and with each of said slots having a straight or flat portion 29 extending and connecting the rounded corners 26 and 27 of the lugs.

As was noted above the lugs 19 on the side member or wall 11 are staggered with respect to the lugs 20 on the side member or wall 12, this staggering is to the effect that adjacent faces of each lug 19 and 20 is in substantial alignment so that the reaches of the cutting wire across the frame are in parallelism. Likewise, the lugs 21 on the end member or wall 13 are staggered with respect to the lugs 22 on the end member or wall 14 so that the adjacent faces thereof are in substantial alignment to have the reaches of the cutting wire longitudinally of the frame in parallelism.

As is usual, the ends of the cutter or cutting wire 23 are anchored, preferably, beneath the usual anchoring screws 31 and 32 which are respectively threaded into the frame to clamp or fasten the ends of the wire beneath their head and a seat 33 and 34 provided in the frame at the time of casting.

Under tests it has been found that other implements utilizing the same size of cutter or cutting wire and similarly formed frames, but with lugs that were devoid of the rounded corners 26 and 27 and the flat bases 29, failed while the implement of the present invention functioned perfectly. In other words, the implement of the present invention resisted pressure on the cutting wire in the neighborhood of one hundred and eighty-five (185) pounds while the other implements each had their wires snapped and broken at one of the corners of a lug around which the cutter wire extended. The only reason that could be deduced for the cutting wire of the present invention resisting breakage under this load was that the rounded lugs 26 and 27 along with the flat base 29 distributed the stresses and strains over a sufficient length of wire that its tensile strength was not exceeded. It is of course to be understood that in these tests the cutting wire 23 was strung on each implement frame with the identical tension.

What is claimed is:

1. In a French fry potato slicer of the class described a casting including opposed side members having their ends joined by end members forming thereby a frame and forming between said side members and end members an opening, said side and end members having a lower contiguous face providing a bottom for the frame in a given plane and said side and end members having an upper contiguous face forming a top for the frame, lugs projecting from said frame bottom each having a length in the direction of the frame member from which it projects, each of said lugs having ends which upstand substantially normal to the frame bottom and with the lugs of one side member staggered with respect to the lugs of the other side member and with the lugs of one end member staggered with respect to the lugs of the other end member so that alternate ends of the lugs of one side and one end member, respectively, are in alignment with the alternate ends of the staggered lugs of the other side and end member, each of said lugs extending outwardly of the opening and provided with a rear face and having the corners of said lugs where the rear face joins with the lug ends rounded and each rounded corner formed to a similar radius of a dimension less than one-half of the length of the lug, each of said lugs having its rear face as a straight line tangential to the rounded corners of its lug, a lip of less length than the lug projecting from each lug in a direction outwardly of the opening and providing beneath the lip a slot whose base is formed by the rear face of the lug, each of said lug slot bases and each of said lug ends extending in a plane substantially parallel with the plane of the frame bottom, a cutter wire extending around said lugs, alternately from end member to end member and from side member to side member, to span the opening between the end members and the side members with the cutter wire throughout its length in a plane substantially parallel with the frame bottom, and means for anchoring the ends of the wire adjacent the first lug and the last lug.

2. In a kitchen implement of the class described, a casting including opposed side members having their ends joined by end members forming thereby a frame and forming between said side members and end members an opening, said side and end members having a lower contiguous face providing a bottom for the frame in a given plane and said side and end members having an upper contiguous face forming a top for the frame, lugs projecting from said frame bottom, each having a length in the direction of the said frame side members, each of said lugs having ends which upstand substantially normal to the frame bottom and with the lugs of one side member staggered with respect to the lugs of the other side member so that alternate ends of the lugs of one side member are in alignment with the alternate ends of the staggered lugs of the other side member, each of said lugs extending outwardly of the opening and provided with a rear face and having the corners of said lugs where the rear face joins with the lug ends rounded and each rounded corner formed to a similar radius of a dimension less than one-half of the length of the lug, each of said lugs having its rear face as a straight line tangential to the rounded corners of its lug, a lip of less length than the lug projecting from each lug in a direction outwardly of the opening and providing, beneath the lip, a slot whose base is formed by the rear face of the lug, each of said lug slot bases and each of said lug ends extending in a plane substantially parallel with the plane of the frame bottom, a cutter wire extending around said lugs, alternately from side member to side member to span the opening between the side members with the cutter wire throughout its length in a plane substantially parallel with the frame bottom, and means for anchoring the ends of the wire adjacent the first lug and the last lug.

References Cited in the file of this patent

UNITED STATES PATENTS

| Number | Name | Date |
|---|---|---|
| 893,591 | Larsen | July 14, 1908 |
| 915,935 | Carmichael et al. | Mar. 23, 1909 |
| 1,045,988 | Larsen | Dec. 3, 1912 |
| 1,615,308 | Merrill | Jan. 25, 1927 |
| 1,653,578 | Larsen | Dec. 20, 1927 |
| 1,695,761 | Hecker | Dec. 18, 1928 |
| 2,152,198 | Lowenfels | Mar. 28, 1939 |